United States Patent [19]
Kahanek et al.

[11] 3,782,739

[45] Jan. 1, 1974

[54] METHOD AND APPARATUS FOR KEEPING FREE THE AGITATOR SHAFT SEALS FROM POLYMERIDE IN POLYMERIZATION VESSELS WITH BOTTOM DRIVE

[75] Inventors: Herbert Kahanek; Karl-Heinz Böhmer; Willi Schiemann; Günter Beckmann, all of Marl, Germany

[73] Assignee: Chemische Werke Huls Aktiengesellschaft, Marl, Germany

[22] Filed: Apr. 21, 1971

[21] Appl. No.: 135,865

[30] Foreign Application Priority Data
Apr. 21, 1970 Germany.................. P 20 19 017.4

[52] U.S. Cl....................... 277/62, 277/65, 277/74, 277/82, 259/DIG. 16
[51] Int. Cl............................ F16j 9/00, F16j 15/16
[58] Field of Search .................... 277/1, 74, 62, 82, 277/65; 259/DIG. 16

[56] References Cited
UNITED STATES PATENTS
| 2,965,398 | 12/1960 | Keller et al. | 277/1 |
| 3,015,505 | 1/1962 | Smith | 277/65 |
| 2,448,042 | 8/1948 | Miller | 277/62 X |
| 3,591,188 | 7/1971 | Eisner | 277/62 |

FOREIGN PATENTS OR APPLICATIONS
911,557  11/1962  Great Britain............... 259/DIG. 16

*Primary Examiner*—Samuel B. Rothberg
*Attorney*—Craig, Antonelli & Hill

[57] ABSTRACT

A method and apparatus for keeping an agitator shaft seal free from polymeride in polymerization vessels with bottom drive and contents in excess of 20 m³, in which a flushing liquid is supplied from the outside into the channel connecting the mechanical seal of the agitator shaft with the vessel interior space, whereby the liquid reaches the vessel interior space from the connecting channel with an average minimum velocity of about 20 cm/sec.

8 Claims, 1 Drawing Figure

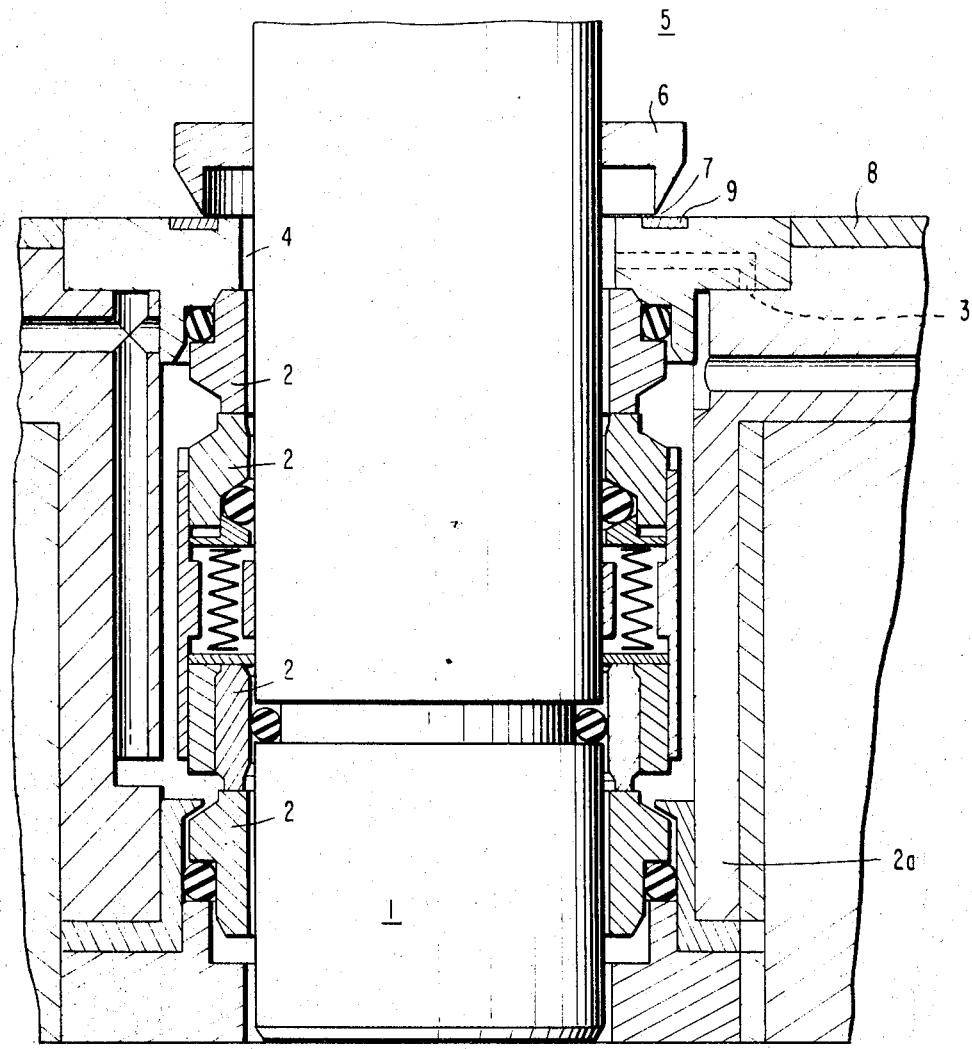

METHOD AND APPARATUS FOR KEEPING FREE THE AGITATOR SHAFT SEALS FROM POLYMERIDE IN POLYMERIZATION VESSELS WITH BOTTOM DRIVE

The present invention relates to a method and apparatus for keeping free the agitator shaft seals from polymeride in polymerization vessels with bottom drive and with contents in excess of 20 m³ used for carrying out liquid-phase polymerizations of all types, especially of suspension and emulsion polymerizations such as that of the vinyl chloride or of the butadiene alone or with each other or also with other co-monomers, for example, of the emulsion polymerization of butadiene or styrol.

The polymerization reaction of vinyl chloride into polyvinylchloride is carried out normally according to discontinuous or continuous processes in pressure-tight agitator vessels. The vinyl chloride and the polymer are thereby suspended in water or emulsified. One also carries out in a similar manner in agitator vessels the emulsion polymerization of butadiene-styrol-mixture polymerides, of pure butadiene or also of other co-monomers with butadiene or vinyl chloride. The presently customary vessels have contents of the order of 8 to 20 m³. These vessels include stirring or agitator members, for example, flat blade paddle agitators, impeller agitators or turbine agitators, which are secured at an agitator shaft extending through the vessel hood. For the most part, the agitator shaft is sealed at the hood by a double-acting mechanical seal ring packing or seal.

Since the need for polymerides increases constantly, there exists the necessity to establish high output production lines or facilities with the use of large polymerization vessels. With the construction of vessels, whose content or volume is larger than 20 m³, one encounters great difficulties in connection with the dimensioning of the agitator shaft. With a polymerization vessel having a volume of 50 m³ for vinyl chloride with an impeller agitator arranged above the vessel bottom, the agitator shaft extending through the vessel hood would have to be constructed at least with a diameter of 300 mm. in order that the strong drive torque can be transmitted vibration-free to the agitating element. With agitating shafts constructed too thin, the shaft gets into strong flexural or bending vibrations by reason of the unavoidable alternating forces acting on the agitator element, which may lead to the fracture or buckling of the shaft. An unintentional stoppage or interruption of the agitating operation may cause serious operational disturbances.

The agitator shafts with more than 250 mm. diameter are expensive, heavy and difficult to assemble. They necessitate mechanical seals for the sealing thereof which are extraordinarily costly both in the initial acquisition as also in the subsequent maintenance.

Consequently, it appears reasonable to drive the agitator element from the vessel bottom by means of a so-called bottom drive. The agitator shaft could thereby be extremely short and would therefore be hardly endangered by bending or flexure vibrations even with a slender construction.

Constructions of polymerization vessels with bottom drive are known as such. However, they are not suited for the realization of all types of polymerizations or co-polymerizations in liquid phase.

In particular, these constructions are not suited for suspension and emulsion polymerizations such as that of the vinyl chloride or of the butadiene alone or also with other co-monomers, for example, of the emulsion copolymerization of butadiene and styrol, because polymeride forms during the reaction in the ring-shaped channel, which leads from the vessel interior space to the mechanical seal ring, whereby the polymeride after a certain time presses apart the two mechanical seal rings sliding one upon the other, which provide a seal in the direction toward the vessel interior space, and permits the blocking oil to enter into the vessel.

The present invention is concerned with the task, for the realization of the polymerizations or copolymerizations in polymerization vessels with a volume in excess of 20 m³, to render the seal of the bottom drive of agitating units durable.

The underlying problems are solved according to the present invention in that a flushing liquid compatible with the polymerization starting formulation is introduced from the outside into the annularly shaped channel connecting the mechanical seal of the agitator shaft with the vessel interior space and from there reaches the vessel interior space with a minimum velocity of 20 cm/sec.

The advantages achieved by the present invention essentially consist in that the mechanical seals of the agitator shaft do not come into contact with the suspension or emulsion of the vessel filling, remain free from polymeride fully operational and therewith enable the safe use of the bottom drive with polymerizations or co-polymerizations in polymerization vessels with a volume in excess of 20 m³.

Accordingly, it is an object of the present invention to provide a polymerization method and apparatus which avoid the aforementioned shortcomings and drawbacks in connection with large-size polymerization vessels.

Another object of the present invention resides in a method and apparatus for keeping the agitator shaft seals free from polymeride in polymerization vessels with bottom drive and of relatively large contents.

A further object of the present invention resides in a polymerization vessel with bottom drive and a content in excess of 20 m³ which permits a long length of life of the agitator shaft seals.

These and further objects, features and advantages of the present invention will become more obvious from the following description when taken in connection with the accompanying drawing which shows, for purposes of illustration only, one embodiment in accordance with the present invention, and wherein:

The single FIGURE is a somewhat schematic cross-sectional view through a polymerization vessel with bottom drive and agitator shaft seals in accordance with the present invention.

Referring now to the single FIGURE of the drawing, the shaft seal at the bottom of a polymerization vessel of a size of about 40 m³ is illustrated in this FIGURE. The agitator shaft 1 is sealed by means of a double-acting mechanical seal ring 2 of conventional construction. The ring-shaped channel 4, which forms the space between the mechanical seal 2 and the vessel interior space 5, is supplied from the outside with the flushing liquid by way of the capillary pipe line 3 provided in the mechanical seal housing 2a; the flushing liquid subsequently flows out of the ring-shaped channel 4 into the vessel interior space 5 in the manner to be described more fully hereinafter.

It has now been discovered that the velocity of the flushing liquid entering into the vessel interior space 5 must not fall below a predetermined value if the penetration of polymerizing emulsified or dispersed substances into the ring-shaped channel 4 in the direction toward the sliding ring seal is to be prevented. It has been discovered that the value of this minimum velocity amounts to about 20 cm/sec., measured as an average value over the cross section of the inlet aperture into the vessel interior space.

In order not to reduce in a non-permissive manner the concentration of the substance to be polymerized or of the polymeride within the vessel, one should feed into the vessel as little flushing liquid as possible.

These requirements and the relatively high minimum velocity of 20 cm/sec. produce together the necessity to constitute the inlet opening of the flushing liquid into the vessel interior space 5 as narrow as possible, i.e., therefore gap-shaped. This may be realized by means of an insert which is mounted in the space between the mechanical seal and the vessel interior space, or with the aid of a possibly multi-partite or adjustable collar mounted above this intermediate space or of any other element, effecting a constriction of the flushing liquid discharge in the direction toward the vessel interior space.

In the embodiment of the present invention illustrated in FIG. 1, an adjustable cap 6 constructed as axially symmetrical body is mounted on the agitator shaft 1 above the ring-shaped channel 4, which leaves open in the direction toward the vessel interior space 5 an annularly shaped gap 7 above a plate 9 having a surface ground flat and inserted into the vessel casing or jacket 8. The height of the gap 7 can be adjusted by the adjustment of the cap 6 in any conventional manner. The smallest possible gap height depends on the precision of the shaft bearing, on the fitting tolerances, on the manufacturing accuracies and the shaft bending.

With the increase of the vessel volume, the ratio of the shaft diameter and of the gap height decreases and therewith also the ratio of the fed-in flushing liquid quantity to volume. Thus, the possibly undesirable decrease of the concentration of the substances to be polymerized or of the polymeride in the vessel is decreased thereby.

The following example which is non-limitative of the present invention, represents typical values for a method and apparatus of this invention.

EXAMPLE

Vinyl chloride suspended in water was polymerized in the polymerization vessel with bottom drive and with a volume of 40 m³ at an operating pressure of 8 atu and at a temperature of 60° C. under constant stirring or agitation. The agitating shaft had a diameter of 245 mm. and rotated with 80 rotations per minute. 260 l/h of water was fed continuously into the vessel interior space in the course of a polymerization duration of 10 hours through an annularly shaped gap of 300 mm. diameter and a gap height adjusted to 0.3 mm. The velocity of the water flowing through the ring-shaped gap amounted to 25 cm/sec. The reduction of the vinyl chloride or polyvinylchloride concentration amounted to 0.027 percent. The mechanical seals were free from polymeride and undamaged after 80 polymerization charges.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An apparatus for keeping agitator shaft seal means free from polymerization vessels with bottom drive means and with relatively large volume, characterized by slide ring seal means for the agitator shaft, ring-shaped channel means connecting the slide ring seal means with the vessel interior space, first means for continuously supplying a flushing liquid from the outside into said channel means, and second means providing a restricted discharge opening of said channel means into the vessel interior space for continuously discharging the flushing liquid from said channel means into the vessel interior space at a predetermined average minimum velocity of about 20 cm/sec.

2. An apparatus according to claim 1, characterized in that said first means includes a capillary pipe line provided in a mechanical seal housing which leads from the outside to said ring-shaped channel means.

3. An apparatus with a vessel casing according to claim 2, characterized in that the second means effecting the constriction of the liquid discharge is a cap constructed as substantially axially symmetrical element which is adjustable on the agitator shaft in the vessel interior space above the channel means and leaves open a ring-shaped gap above a plate with flat ground surface inserted into the vessel casing.

4. An apparatus for keeping agitator shaft seal means free from polymeride in polymerization vessels with bottom drive means and with relatively large volumes, characterized by slide ring seal means for the agitator shaft, ring-shaped channel means connecting the slide ring seal means with the vessel interior space, first means for supplying a flushing liquid from the outside into said channel means, and second means providing a restricted discharge for the flushing liquid from the said channel means into the vessel interior space, said first means including a capillary pipe line provided in a slide ring seal housing which leads from the outside to said ring-shaped channel means.

5. An apparatus with a vessel casing according to claim 1, characterized in that the second means effecting the constriction of the liquid discharge is a cap constructed as substantially axially symmetrical element which is adjustable on the agitator shaft in the vessel interior space above the channel means and leaves open a ring-shaped gap above a plate with flat ground surface inserted into the vessel casing.

6. An apparatus according to claim 1, characterized in that the volume of the vessel is in excess of about 20 m³.

7. An apparatus according to claim 4, characterized in that the volume of the vessel is in excess of about 20 m³.

8. An apparatus according to claim 4, characterized in that the first and second means provide a predetermined average minimum velocity of about 20 cm/sec for the flushing liquid at the discharge of the flushing liquid from the channel means into the vessel interior space.

* * * * *